UNITED STATES PATENT OFFICE.

HERMAN DECKER, OF HANOVER, GERMANY, ASSIGNOR TO FARBENFABRIKEN VORM. FRIEDR. BAYER & CO., OF ELBERFELD, GERMANY, A CORPORATION OF GERMANY.

ALKYLHOMOPIPERONYLAMINS AND THE PROCESS OF MAKING THEM.

1,073,966.

Specification of Letters Patent.   Patented Sept. 23, 1913.

No Drawing.   Application filed November 25, 1912. Serial No. 733,351.

*To all whom it may concern:*

Be it known that I, HERMAN DECKER, doctor of philosophy, chemist, citizen of the German Empire, residing at Hanover, Germany, have invented new and useful Improvements in Alkylhomopiperonylamins and the Process of Making Them, of which the following is a specification.

I have found that the hitherto unknown alkylhomopiperonylamins can be obtained by treating the condensation products derived from aldehydes and homopiperonylamin ($C_{10}H_{15}NO_2$) with halogenalkyls such as $CH_3I$; $C_2H_5I$, etc., and decomposing these products. The reaction proceeds for instance in accordance with the following equations:

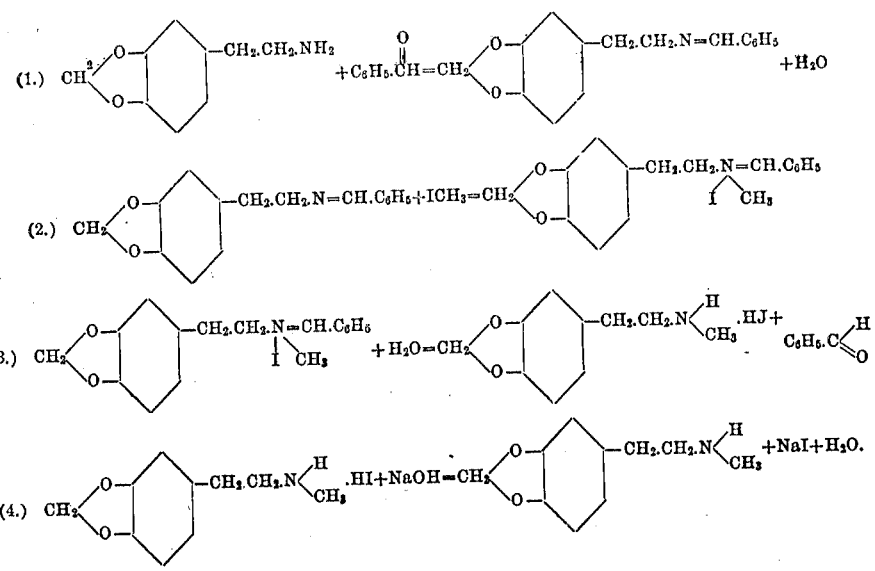

The methylhomopiperonylamin thus obtained is a colorless oil boiling at 156–158° (24mm.) It forms crystalline salts *e. g.* with carbonic acid a white fine crystalline carbonate melting at 72–75° C., with hydrochloric acid white glittering sheets melting at 183–185° C. easily soluble in water and alcohol.

The iodohydrate is easily soluble in water and alcohol and difficultly soluble in acetic ether from which it crystallizes in brilliant white sheets melting at 135 to 136° C.

By treating the alkylhomopiperonylamins with anhydrous formic acid and splitting off water from the formates the formyl compounds are obtained, which can be condensed with acid dehydrating agents to the salts of hydrastinin respectively its homologues.

The formylmethylhomopiperonylamin is for instance a colorless thick oil easily soluble in benzene, alcohol, ligroin and insoluble in water. The formylethylhomopiperonylamin is obtained in an analogous manner.

In order to illustrate the new process more fully the following example is given, the parts being by weight:—253 parts of the condensation product $C_{16}H_{15}NO_2$ melting at 36° C. (obtained by heating 106 parts of benzaldehyde with 165 parts of homopiperonylamin for half an hour to 100° C.) are heated with 142 parts of $CH_3I$ and the necessary quantity of benzene to dissolve the condensation product for 5 hours to 100° C. and in absence of air and water. The product of addition thus produced is decomposed with steam until the smell of benzaldehyde has disappeared. The remaining acid solution is rendered alkaline with caustic soda and the base is distilled with steam and evaporated together with hydrochloric acid. The methylhomopiperonylamin can be obtained in a pure state from its chlorohydrate by treating this salt with alkali and distilling the dried base *in vacuo* (24 mm.) at 156 to 158° C.

The ethylhomopiperonylaminjodid obtained in an analogous manner crystallizes in the shape of white sheets melting at 126–128° C., which are easily soluble in water, alcohol, acetone and acetic ether.

I claim:—

1. The herein described alkylhomopiperonylamins of the formula:

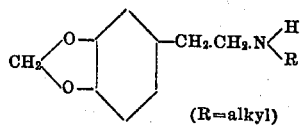

(R=alkyl)

being colorless oils which form white crystalline salts generally soluble in alcohol and water and being converted by treatment with anhydrous formic acid into formylalkylhomopiperonylamins being colorless thick oils soluble in most organic solvents and insoluble in water, which are obtained by treating the condensation products *e. g.* $C_{16}H_{15}NO_2$ with halogenalkyl and decomposing these addition products, substantially as described.

2. The herein described methylhomopiperonylamin being a colorless oil boiling at 156–158° C. (24 mm.) which forms with hydrochloric acid white brilliant sheets melting at 178–180° C., easily soluble in alcohol and water and being converted by treatment with anhydrous formic acid into the formylmethylhomopiperonylamin, which is a colorless thick oil easily soluble in benzene, alcohol, ligroin and insoluble in water, substantially as described.

In testimony whereof I have hereunto set my hand in the presence of two subscribing witnesses.

HERMAN DECKER. [L. S.]

Witnesses:
 HELEN NUFER,
 ALBERT NUFER.